United States Patent
Park et al.

(10) Patent No.: US 9,021,451 B2
(45) Date of Patent: Apr. 28, 2015

(54) CALL GRAPH SIMPLIFICATION/COMPARISON AND AUTOMATIC INITIAL SUSPECTS FINDING OF PERFORMANCE DEGRADATIONS

(71) Applicant: SAP AG, Walldorf (DE)

(72) Inventors: Cheolman Park, Seoul (KR); Chan Young, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/926,894

(22) Filed: Jun. 25, 2013

(65) Prior Publication Data

US 2014/0040869 A1  Feb. 6, 2014

Related U.S. Application Data

(63) Continuation of application No. 12/763,070, filed on Apr. 19, 2010, now Pat. No. 8,473,928.

(51) Int. Cl.
| | |
|---|---|
| G06F 9/44 | (2006.01) |
| G06F 9/45 | (2006.01) |
| G06F 11/36 | (2006.01) |

(52) U.S. Cl.
CPC ........ G06F 11/3612 (2013.01); G06F 11/3636 (2013.01)

(58) Field of Classification Search
CPC ............... G06F 17/30958; G06F 17/30489
See application file for complete search history.

(56) References Cited

U.S. PATENT DOCUMENTS

| | | | |
|---|---|---|---|
| 5,485,616 A | 1/1996 | Burke et al. | |
| 5,797,012 A * | 8/1998 | Blainey et al. | 717/157 |
| 5,828,883 A | 10/1998 | Hall | |
| 7,392,514 B2 * | 6/2008 | Edwards | 717/156 |
| 7,661,095 B2 | 2/2010 | George | |
| 7,681,182 B1 | 3/2010 | Mistry et al. | |
| 7,844,959 B2 | 11/2010 | Isard | |
| 7,853,930 B2 * | 12/2010 | Mitchell et al. | 717/131 |
| 8,347,272 B2 * | 1/2013 | Sugawara et al. | 717/133 |
| 2006/0150168 A1 | 7/2006 | Mitchell et al. | |
| 2008/0098375 A1 * | 4/2008 | Isard | 717/149 |
| 2008/0288931 A1 * | 11/2008 | Kohli | 717/157 |

(Continued)

OTHER PUBLICATIONS

Rakesh Ghiya et al.; Is it a tree, a DAG, or a cyclic graph? a shape analysis for heap-directed pointers in C; 1996 ACM; 15 pages; <http://dl.acm.org/citation.cfm?id=237724>.*

(Continued)

*Primary Examiner* — Thuy Dao
*Assistant Examiner* — Cuong V Luu
(74) *Attorney, Agent, or Firm* — Fountainhead Law Group PC

(57) ABSTRACT

In one embodiment, a method for call graph analysis is provided. The method includes determining a plurality of nodes in a call graph. The plurality of nodes represent resource consumption of functions of a software program executed in a software system. A simplification factor is determined. A first set of nodes in the plurality of nodes is then eliminated based on exclusive values for the plurality of nodes, inclusive values for the plurality of nodes, and the simplification factor. An inclusive value for a node is a first amount of resources consumed by the node and any descendent nodes of that node. An exclusive value for the node is a second amount of resources consumed by the node. A simplified call graph is output including a second set of nodes in the plurality of nodes. The second set of nodes does not include the eliminated first set of nodes.

14 Claims, 19 Drawing Sheets

(56) References Cited

U.S. PATENT DOCUMENTS

| | | | | |
|---|---|---|---|---|
| 2009/0249308 | A1* | 10/2009 | Li et al. | 717/132 |
| 2009/0293049 | A1* | 11/2009 | Gorelkina | 717/157 |
| 2010/0284527 | A1* | 11/2010 | Fink et al. | 717/132 |
| 2010/0325621 | A1* | 12/2010 | Andrade et al. | 717/156 |
| 2011/0138369 | A1* | 6/2011 | Chandra et al. | 717/133 |
| 2011/0145800 | A1* | 6/2011 | Rao et al. | 717/133 |
| 2011/0154300 | A1* | 6/2011 | Rao et al. | 717/133 |

OTHER PUBLICATIONS

Gail C. Murphy; An empirical study of static call graph extractors; 1998 ACM; pp. 158-191; <http://dl.acm.org/citation.cfm?id=279314>.*

Frank R. Kschischang; Factor Graphs and the Sum-Product Algorithm; 2001 IEEE; pp. 498-519; <http://ieeexplore.ieee.org/xpls/abs_all.jsp?arnumber=910572&tag=1>.*

Georg Sander; Graph Layout Through the VCG Tool; 1994 Springer; pp. 194-205; <http://link.springer.com/chapter/10.1007/3-540-58950-3_371>.*

David Grove; A framework for call graph construction algorithms; 2001 ACM; pp. 685-746; <http://dl.acm.org/citation.cfm?id=506316>.*

Jens Gramm et al.; Automated Generation of Search Tree Algorithms for Hard Graph Modification Problems; 2004 Springer; pp. 322-347; <http://link.springer.com/article/10.1007/s00453-004-1090-5>.*

Intel(R) VTune(TM), retrieved from http://software.intel.com/en-us/intel-vtune 2010.

GNU Binutils, retrieved from http://www.gnu.org/software/binutils/ 2010.

SUN Studio, retrieved from http://developers.sun.com/sunstudio/ and http://docs.sun.com/app/docs/doc/821-0304/afaml?a+browse Nov. 2009.

Paul E. McKenney, "Differential Profiling," Sequent Computer Systems, Inc.,1995—In MASCOTS'95.

Martin Schulz and Bronis R. deSupinski,"Practical Differential Profiling," Center for Applied Scientific Computing, Lawrence Livermore National Laboratory. EuroPar 2007 , Aug. 2007.

CVS—Concurrent Versions System, Open Source Version Control, retrieved from http://www.nongnu.org/cvs/Dec. 2006.

Perforce Software, retrieved from http://perforce.com/Feb. 2010.

IBM Rational ClearCase, retrieved from http://www-01.ibm.com/software/awdtools/clearcase Feb. 2010.

Exuberant CTAGS, retrieved from http://ctags.sourceforge.net and http://ctags.sourceforge.net/ctags.html Feb. 2010.

John Levon, "OProfile Manual," Chapter 4, Section 22.4. Differential profiles with opreport. Victoria University of Manchester. 2004.

David Grove et al., "A Framework for Call Graph Construction Algorithms," 2001 ACM, pp. 685-746, retrieved from http://dl.acm.org/citation.cfm?id=264352.

E.R. Gansner et al., "DAG-A Program that Draws Directed Graphs," 1988 John Wiley & Sons, Ltd., pp. 1047-1062.

Fan Chung et al., "A Random Graph Model for Massive Graphs," 2000 ACM, pp. 171-180.

David Grove et al., "Call Graph Construction in Ob-ject-Oriented Languages," 1977 ACM, pp. 108-124.

Gail C. Murphy et al., "AnEmpirical Study of Static Call Graph Extractors," 1998 ACM, pp. 158-191.

Carolyn L. McCreary et al., "Using Graph Parsing for Automatic Graph Drawing," 1998 IEEE, pp. 545-561.

* cited by examiner

```
// G is a target call graph for simplification
// S is a simplification factors given by user (0 <= S <= 1)
Simplify1(CallGraph G, double S)
BEGIN
      A = 0      // A is the maximum attributed value among eliminated edges
      C = 0      // C is the sum of exclusive value of eliminated nodes
      T = Inclusive(Root(G))   // T is the total resource consumption
      b = FALSE  // Boolean flag that means that elimination of the node
                 //   causes a call graph separated Add all nodes into the node list L, and sort L ordered by inclusive values // Elimination of minor nodes
      FOR each node n in L DO
            FOR each edge e in OutEdges(N) DO
                  IF NOT IsReachableFromRootWithoutEdge(G, Callee(e), e) THEN
                        b = TRUE
                        EXIT FOR
                  ENDIF
            ENDFOR
            IF b = FALSE THEN // All callees are reachable from root
                              //   when the current node is eliminated
                  EliminateNode(n, C, A)
            ELSE
                  b = FALSE   // reset separation flag
            ENDIF
            IF C >= T * (1 - S) THEN
                  EXIT FOR
            ENDIF
      ENDFOR // Elimination of minor edges
      FOR each edge e in G where Attributed(e) < A DO
            IF IsReachableFromRootWithoutEdge(G, Callee(e), e) THEN
                  Eliminate edge e from G
            ENDIF
      ENDFOR
END
```

Fig. 5A

```
EliminateNode(Node N, double C, double A)
BEGIN
      A = max(   A,
                 Attributed values of InEdges(N),
                 Attributed values of OutEdges(N))
      C += Exclusive(N)
      IF C < T * (1 - S) THEN
            FOR each edge e in InEdges(N) DO
                  IF Inclusive(Caller(e)) <= Inclusive(N) THEN
                        EliminateNode(Caller(e),  C, A)
                  ENDIF
            ENDFOR
      ENDIF
      Remove Node N
      Remove all edges in InEdges(N)
      Remove all edges in OutEdges(N)
END IsReachableFromRootWithoutEdge(CallGraph G, Node N, Edge E)
BEGIN
      FOR each node n in G by DFT-variant order from N without edge E DO
      IF n = Root(G) THEN
            RETURN TRUE
      ENDIF
      ENDFOR
RETURN FALSE
```

Fig. 5B

CALL GRAPH SIMPLIFICATION/COMPARISON AND AUTOMATIC INITIAL SUSPECTS FINDING OF PERFORMANCE DEGRADATIONS

CROSS REFERENCE TO RELATED APPLICATIONS

The present disclosure is a continuation of and claims priority to U.S. patent application Ser. No. 12/763,070 for "Call Graph Simplification/Comparison and Automatic Initial Suspects Finding of Performance Degradations" filed Apr. 19, 2010, which is hereby incorporated herein by reference in its entirety for all purposes.

BACKGROUND

Particular embodiments generally relate to call graph analysis.

A call graph is a directed graph that represents calling relations between functions in a software system. The software system may be a combination of hardware and software, e.g., a computing system executing a software program. The call graph may represent relationships between sub-routines (e.g., functions) in the software program. A call graph profiler can construct a call graph by collecting calling sequences between functions along with resource consumption during execution of the software program by a computing device. Users then use a call graph generated by the call graph profiler to optimize the software program.

One problem with call graph analysis is the complexity of large software systems. For example, with a large number of functions and call sequences, the call graph may become very large and complex. In this case, a user analyzing the call graph may only analyze small parts of the call graph. However, some critical problems may have occurred in unanalyzed parts of the call graph.

Another problem is that call graph analysis becomes exponentially difficult if multiple call graphs are involved. For example, the investigation of gradual performance degradation over multiple releases of a software program or the analysis of performance differences among different configurations becomes very difficult.

A last problem is that performance regression testing in a quality assurance (QA) process could not detect critical performance degradation if performance optimizations had been applied simultaneously. Even if the performance degradation was detected, it was not easy to fix the problem quickly because of difficulties in analysis. This is because multiple parts of the software system can affect performance directly and indirectly. Sometimes, users have to review a code change history among several snapshots of the code to determine where performance degradation occurs. Also, incremental performance tests may be performed by applying every single change to the change history one by one and checking which change causes the regression. This is a very tedious process for a user to perform.

SUMMARY

In one embodiment, a method for call graph analysis is provided. The method includes determining a plurality of nodes in a call graph. The plurality of nodes represent resource consumption of functions of a software program executed in a software system. A simplification factor is determined. A first set of nodes in the plurality of nodes is then eliminated based on exclusive values for the plurality of nodes, inclusive values for the plurality of nodes, and the simplification factor. An inclusive value for a node is a first amount of resources consumed by the node and any descendent nodes of that node. An exclusive value for the node is a second amount of resources consumed by the node. A simplified call graph is output including a second set of nodes in the plurality of nodes. The second set of nodes does not include the eliminated first set of nodes.

In one embodiment, a method is provided comprising: determining a plurality of nodes in a call graph, the plurality of nodes representing resource consumption of functions of a software program executed in a software system; determining a simplification factor; eliminating, by a computing device, a first set of nodes in the plurality of nodes based on exclusive values for the plurality of nodes, inclusive values for the plurality of nodes, and the simplification factor, wherein an inclusive value for a node is a first amount of resources consumed by the node and one or more descendant nodes to the node, and wherein an exclusive value for the node is a second amount of resources consumed by the node; and outputting a simplified call graph including a second set of nodes in the plurality of nodes, the second set of nodes not including the eliminated first set of nodes.

In another embodiment, a computer-readable storage medium comprises logic that, when executed by one or more computer processors, is operable to: determine a plurality of nodes in a call graph, the plurality of nodes representing resource consumption of functions of a software program executed in a software system; determine a simplification factor; eliminate a first set of nodes in the plurality of nodes based on exclusive values for the plurality of nodes, inclusive values for the plurality of nodes, and the simplification factor, wherein an inclusive value for a node is a first amount of resources consumed by the node and one or more descendant nodes to the node, and wherein an exclusive value for the node is a second amount of resources consumed by the node; and output a simplified call graph including a second set of nodes in the plurality of nodes, the second set of nodes not including the eliminated first set of nodes.

In another embodiment, a method is provided comprising: determining a plurality of call graphs; determining an aggregation function to determine a merged call graph from the plurality of call graphs; aggregating inclusive values for each node of the plurality of call graphs using the aggregation function; aggregating exclusive values for each node of the plurality of call graphs using the aggregation function; and generating the merged call graph using the aggregated inclusive and exclusive values for the plurality of call graphs.

The following detailed description and accompanying drawings provide a better understanding of the nature and advantages of the present invention.

BRIEF DESCRIPTION OF THE DRAWINGS

FIGS. 5A and 5B show pseudocode that performs the call graph simplification process according to one embodiment.

DETAILED DESCRIPTION

Described herein are techniques for a call graph analysis system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Call Graph Simplification

Figure 1:
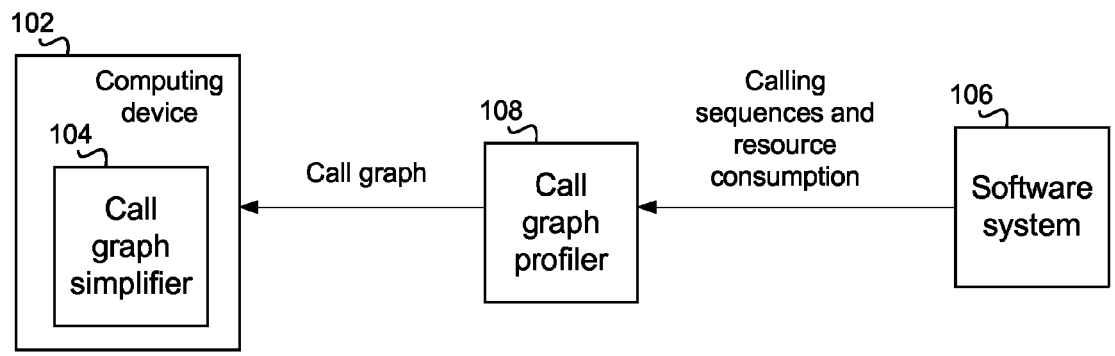
FIG. 1 depicts a simplified system for call graph simplification according to one embodiment.

FIG. 1 depicts a simplified system 100 for call graph simplification according to one embodiment. System 100 includes a computing device 102 that includes a call graph simplifier 104, a software system 106, and a call graph profiler 108.

Software system 106 may be a combination of hardware and software, e.g., a computing system executing a software program. For example, software system 106 may include one or more computing devices that execute the software program. A call graph profiler 108 may analyze the execution of software system 106 to generate a call graph. Call graph profiler 108 may be part of call graph simplifier 104 or may be a separate application. Call graph profiler 108 may generate the call graph by collecting calling sequences between functions of the software program and the resource consumption during execution of software system 106. The information for resource consumption that may be collected includes computer processing unit (CPU) resource profiles, hardware (HW) events (e.g., cache misses or translation look-aside buffer (TLB) misses), or memory allocation information. The generated call graph is a graphical representation of the calling relationships between functions in a software program and the resource consumption of the functions.

Call graph simplifier 104 receives the call graph and simplifies the call graph. A simplification allows a user to analyze the call graph more efficiently. In one embodiment, call graph simplifier 104 eliminates nodes and edges of the call graph based on an analysis that will be described in more detail below.

Figure 2A:
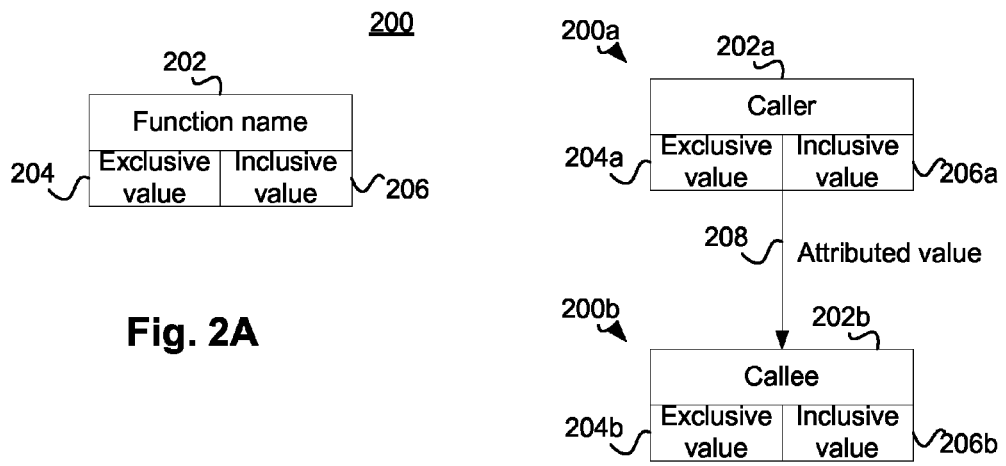
FIG. 2A shows an example of a node according to one embodiment.

The call graph may include a plurality of nodes that represent functions of software system 106. FIG. 2A shows an example of a node 200 according to one embodiment. Node 200 includes a section 202 for a function name, a section 204 for an exclusive value, and a section 206 for an inclusive value. The inclusive value may be the total resources consumed by that function and any functions that correspond to descendent nodes in the call graph. For example, the inclusive value of node 200 may be equal to the sum of its exclusive value and all attributed values of out-bound edges. Similarly, the inclusive value may be equal to the sum of all in-bound edges of node 200. An exclusive value represents resources consumed only by that function.

Figure 2B:
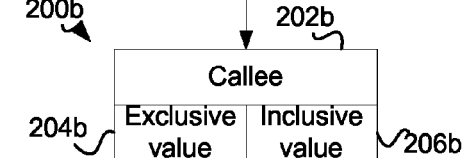
FIG. 2B depicts an example of a function calling another function according to one embodiment.

Functions may call other functions during execution of software system 106. FIG. 2B depicts an example of a function calling another function according to one embodiment. A first node 200a is defined as a caller node and a second node 200b is defined as a callee node. Caller node 200a is connected to callee node 200b through an edge 208. A caller is a function (caller function) that calls another function (callee function).

Each edge 208 may include an attributed value. An attributed value represents how much of an inclusive value came from a call. For example, the attributed value may be an amount of resources that were consumed by callee function 200b as a result of being called by caller function 200a.

The above notations are used to generate a call graph. For example, call graph profiler 108 may profile the execution of a software program by a computing device and generate a call graph. In one example, the following is pseudocode represents the execution of a software program in software system 106:

```
void Root ( )
{
   A( );
   B( );
}
void A( )
{
   . . . // some computations
   C( );
}
void B( )
{
   D( );
   . . . // some computations
}
void C( )
{
   . . . // some computations
   D( );
   . . . // some computations
}
void D( )
{
   . . . // some computations
}
```

In this disclosure, the following notations may be used in pseudo code.

Figure 3:
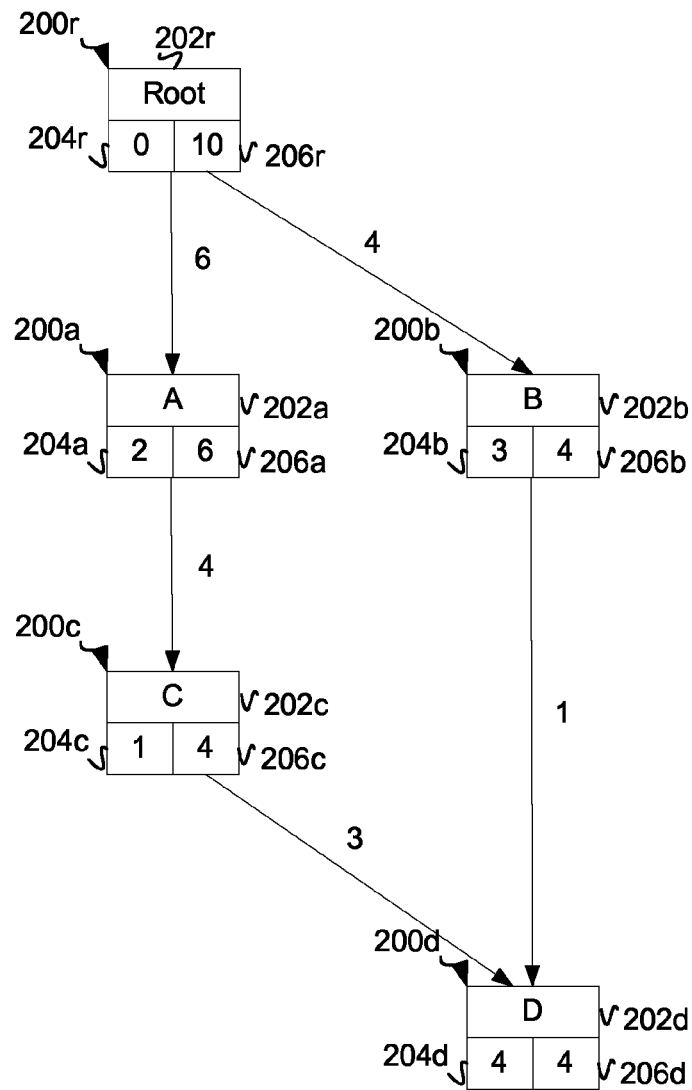
FIG. 3 shows an example of a call graph according to one embodiment.

Root(G): Root node of a call graph G
Node(G, s): Node whose name is s in a call graph G
Edge(N1, N2): Edge started from node N1 and ended to node N2
Symbol(N): Symbol name of node N
Inclusive(N): Inclusive value of node N
Exclusive(N): Exclusive value of node N
Attributed(E): Attributed value of edge E
InEdges(N): Edge set that contains all incoming edges of node N
OutEdges(N): Edge set that contains all outgoing edges of node N
Caller(E): Caller node of edge E
Callee(E): Callee node of edge E FIG. 3 shows a call graph 300 that is generated from execution of the above software program according to one embodiment. Call graph 300 includes a plurality of nodes 200 with function names Root, A, B, C, and D.

In this example, call graph 300 is profiling CPU resources used. That is, the amount of CPU resources used by functions represented by nodes 200 is being profiled. In total, execution of the software program spent 10 CPU time, which is represented by the inclusive value at node 206r of root node 200r. Functions A, B, C, and D spent 2, 3, 1, and 4 CPU time, respectively. These values are shown as the exclusive values in sections 204a, 204b, 204c, and 204d, respectively.

For function A, the inclusive value is 6 CPU time in section 206a, which means the CPU time consumption for function A and the CPU time consumption caused by consequent calls from function A is 6. In this case, function A spent 2 CPU time itself. The consequent call is from function A to C. An attributed value between function A to C is 4 CPU time, which means the CPU time consumption caused by the function call from A to C is 4. The inclusive value is determined by adding the time spent by function A itself and any attributed values for edges connected to function A. In this case, the inclusive value is 2+4=6.

The attributed value helps identify the sources of resource consumption for a function. For example, function D spent 4 CPU time and it can be determined from the attributed values that three out of the four CPU time were spent due to a function call from C to D and that one out of the four CPU time was spent due to a function call from B to D.

Once call graph 300 is generated, it may be used to review the internal software program behavior and resource consumption. For example, call graph 300 may be used for performance optimization of software system 106. Particular embodiments simplify call graph 300 to allow a user to more efficiently optimize or analyze the simplified call graph.

Figure 4A:
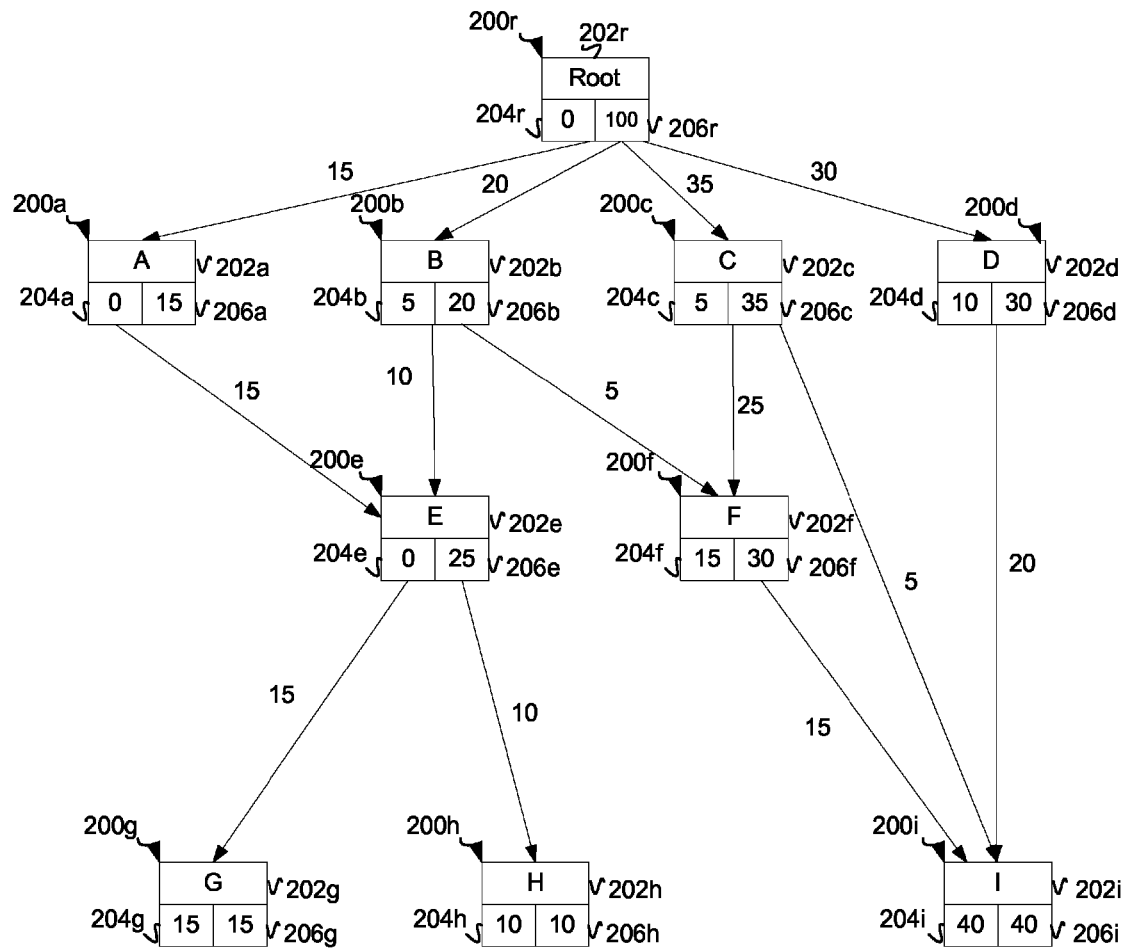
FIGS. 4A-4F show the call graph simplification process according to one embodiment.

The following describes an example of call graph simplification according to one embodiment. FIG. 4A shows an example of call graph 300 according to one embodiment. Particular embodiments simplify call graph 300 by eliminating minor nodes and preserving call paths (edges) to remaining nodes. The minor nodes are determined based on inclusive values of the nodes in the call graph and represent nodes that are considered least important.

A simplification factor (e.g., threshold) is used to determine when to stop simplifying call graph 300. For example, a simplification factor of 0.7 may result in a simplified call graph that contains only 70% of total resource consumption. Thus, the amount of reduced resource consumption shown in the simplified call graph is based on the simplification factor. The exclusive values of eliminated nodes may be compared to a threshold based upon the simplification factor. Because the simplification factor is 0.7 and the total resource consumption is 100, the threshold may be 70% of 100, which is 30. To provide a 30% total resource reduction, the sum of exclusive values of nodes that are eliminated should be greater than or equal to 30 to obtain this simplification factor. The exclusive value is the total resources consumed by each function and thus a value of 30 would represent a 30% reduction in resources used.

Particular embodiments eliminate what are determined to be minor nodes and also minor edges. Minor nodes and minor edges may be nodes and edges that are considered less critical or not as important as other nodes. In one example, the least significant inclusive values are eliminated first. Although the least significant inclusive values are eliminated first, it will be understood that other methods may be used. In one example, all nodes 200 are sorted by their inclusive values. In this case, a list of nodes 200 sorted by their inclusive values may be H (10), G (15), A (15), B (20), E (25), D (30), F (30), C (35), and I (40).

The elimination of the least significant inclusive values first may be used because the amount of resources consumed by nodes with lower inclusive values may affect software system 106 the least. This may mean that a selected node 200 may have the least amount of affect on resource consumption of software system 106.

Call graph simplifier 104 first analyzes node H to determine if it should be eliminated. Call graph simplifier 104 may use a set of criteria to determine if nodes should be eliminated. For example, call graph 300 is analyzed to determine if the removal of node H would leave any descendent nodes without any call paths to the root node. In this case, node H does not have any descendent nodes and call graph simplifier 104 does not find any reason to keep node H. Node H is thus added to a set of eliminated nodes.

When a node is eliminated, a total amount of exclusive values is stored. The total amount of exclusive values is compared to the simplification factor to determine when to stop the simplification of call graph 300. In this case, the exclusive value for node H of 10 is added to the total eliminated exclusive values. In one example, a value for a variable associated with the total eliminated exclusive values, such as a variable named C, may be updated. The variable C may accumulate the exclusive values of all eliminated nodes.

Additionally, a maximum value of eliminated edges may be stored, such as in a variable named A. The maximum number of eliminated edges is used to eliminate edges 208 after nodes 200 are eliminated, the process of which is described later. The variable A may be the maximum value of any attributed values associated with eliminated edges, and is not accumulated.

Figure 4B:
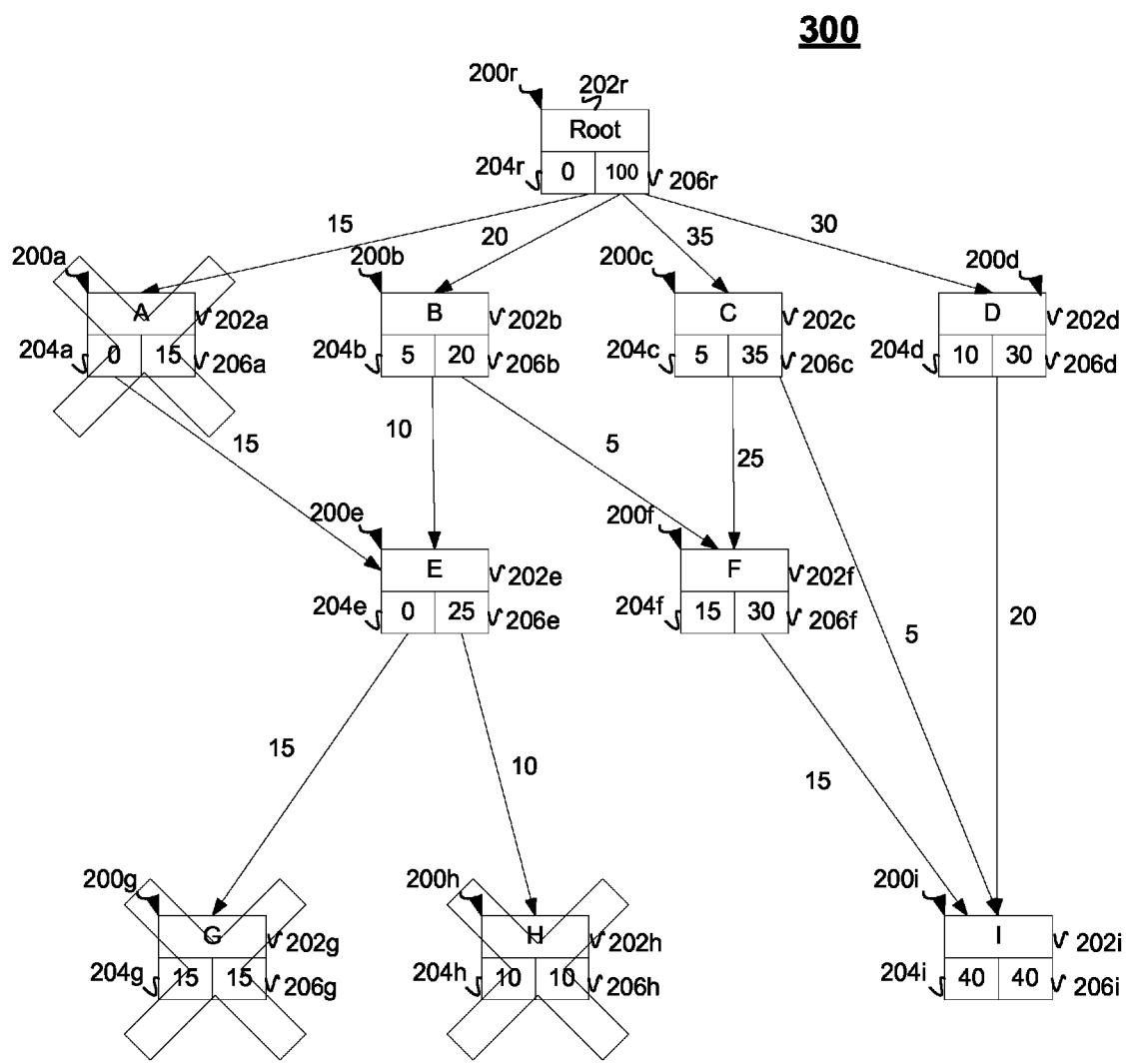

Node H is removed from call graph 300 with its adjacent edges. For example, the edge from node E to node H is removed. Following the above process, nodes G and A are reviewed next because they have the next lowest inclusive values. Node A includes an edge from node A to node E; however, node E includes an edge from node B to node E and thus would not be a node without any calling paths if node A was eliminated. Thus, node A is eliminated. Node G is also eliminated because removing it would not cause any nodes to be without a path to the root node. FIG. 4B shows the elimination of nodes A, G, and H.

The variable C is updated with a total of the exclusive values for the eliminated nodes. The values of 0 and 15 for nodes A and G are added to the existing value of 10. Also, the variable A is updated with a value of 15, which is the maximum attributed value for any eliminated edges.

Figure 4C:
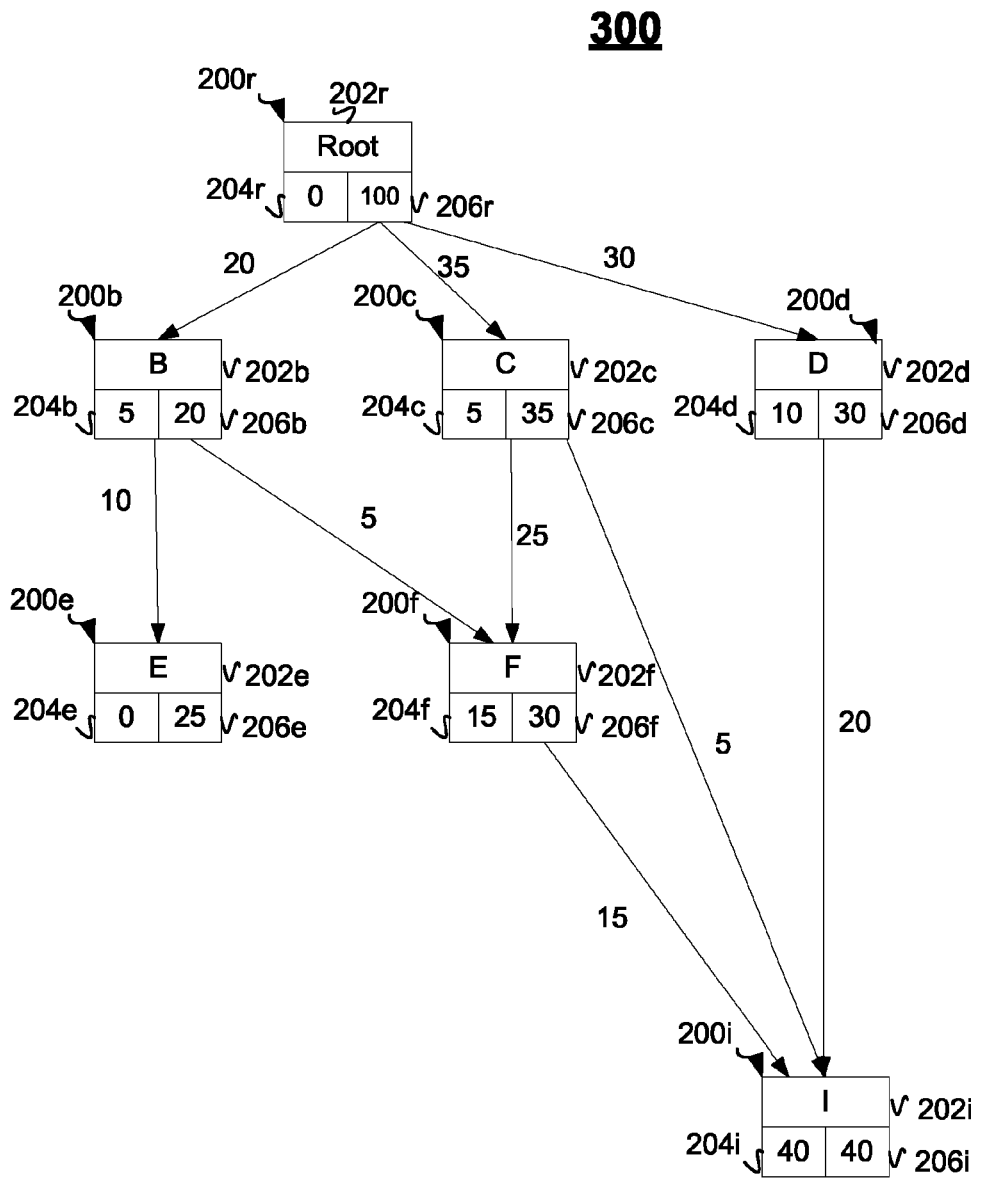

Node B is then analyzed to determine if it should be eliminated. Referring to FIG. 4C, if node B was eliminated, node E is not reachable through any other nodes because node A has been eliminated previously. Thus, call graph simplifier 104 does not remove node B in call graph 300. FIG. 4C shows the current status of call graph 300 with node B not eliminated.

Figure 4D:
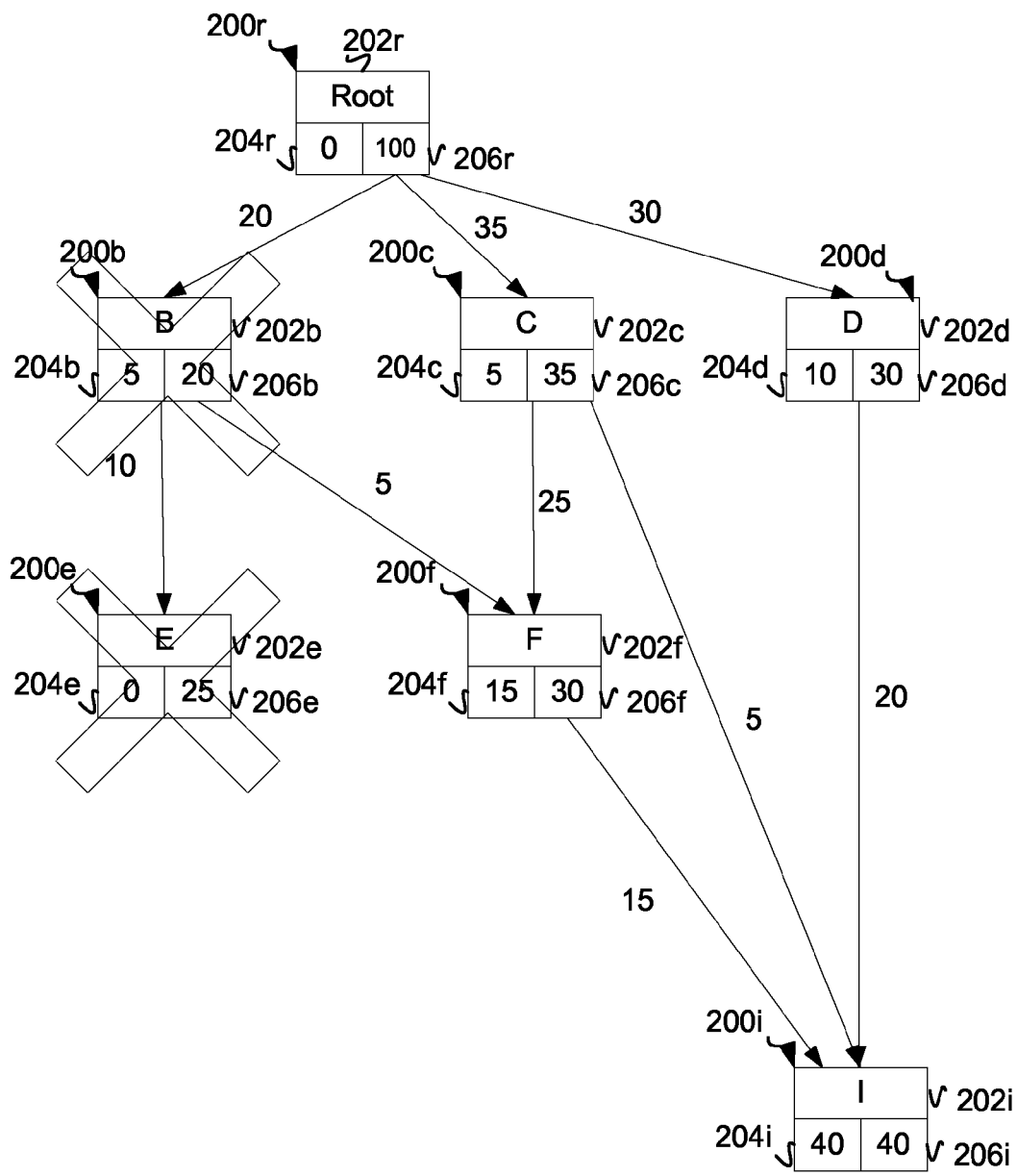

Node E is then analyzed and is eliminated when it is determined no nodes would be without a path to the root node. In one embodiment, call graph simplifier 104 may check any callers of an eliminated node whose inclusive value is less than the current eliminated nodes' inclusive value to determine if the caller node should be eliminated. In this case, node B is checked and is eliminated because node B no longer has the restriction that node E would become unreachable from the root node due to node E being eliminated. Thus, call graph simplifier 104 eliminates nodes E and B. FIG. 4D shows an example of call graph 300 with nodes B and E eliminated.

The variable C is updated with a total of the exclusive values for the eliminated nodes. The value of 5 for node B and the value of 0 for node E are added to the current value of 25. Also, the variable A is updated. The attributed value for node E is 10, which is not higher than the current value of 15 for the variable A, and thus the value for variable A stays at 15. However, the attributed value for node B is 20 and this value is stored as the new value for variable A.

Each time a node is eliminated, the total exclusive value is checked to determine if it meets the simplification value threshold. Before nodes E and B were eliminated, the total exclusive value had not met the simplification value threshold. However, the total exclusive values for nodes H, G, A, B, and E is a total of 30. This is compared to the simplification factor threshold and meets the simplification factor threshold. At this point, call graph simplifier 104 stops the elimination of nodes 200.

Figure 4E:
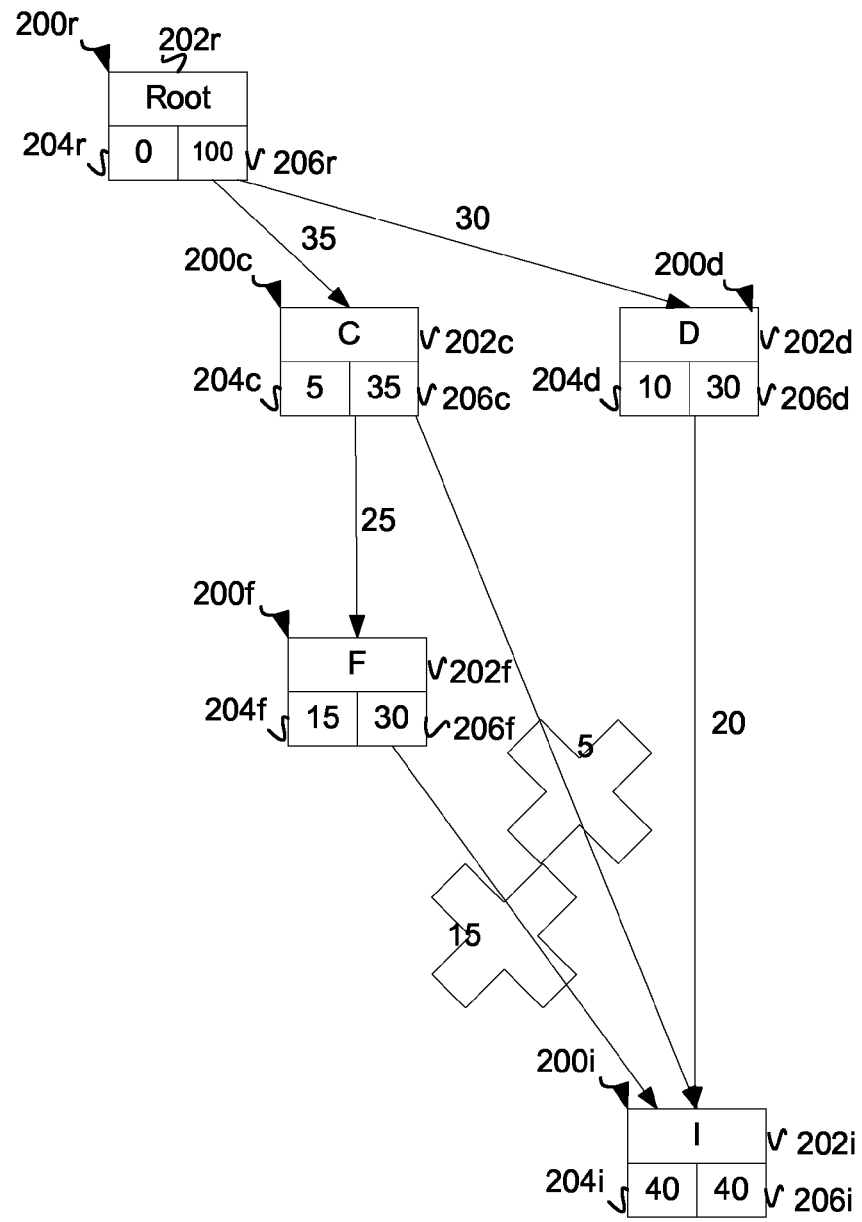

Call graph simplifier 104 may also eliminate minor edges. Minor edges may be edges that if eliminated, do not leave a node without a path to the root node. In one embodiment, minor edges with attributed values that are less than a threshold may be eliminated. The maximum for the variable A is 20 because that is the maximum attributable value for an edge that was eliminated in the call graph simplification. Minor edges with attributed values less than the maximum attributable value are then eliminated. In this case, edges from node C to node I and from node F to node I are eliminated because their attributed values are 5 and 15, respectively. FIG. 4E shows the elimination of minor edges according to one embodiment.

Table I below shows the history of the above node elimination and value changes for variables of C and A.

TABLE I

| Eliminated Node | C | A |
|---|---|---|
| H | 10 | 10 |
| G | 25 | 15 |
| A | 25 | 15 |
| E | 25 | 15 |
| B | 30 | 20 |

As can be seen, the variable C accumulates all the values of the exclusive values for the eliminated nodes. Also, the variable A is changed when an eliminated node has an attributed value is greater than the stored value.

Figure 4F:
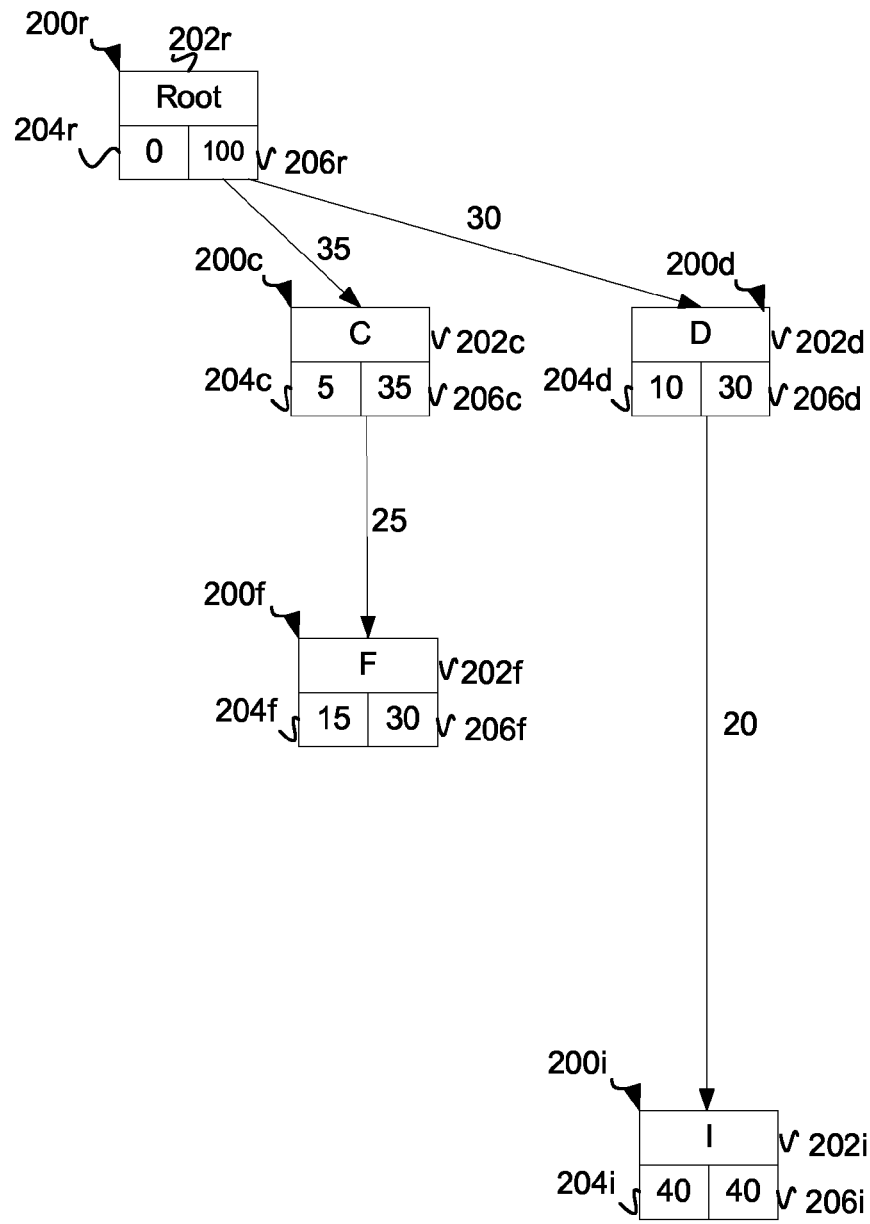

FIG. 4F shows the simplified call graph according to one embodiment. This call graph includes 5 nodes and 4 edges. A user can concentrate on analyzing these nodes to determine if any optimization of software system 106 may be performed. It is expected that these nodes may have the most significant impact on software system 106.

FIGS. 5A and 5B show pseudocode that performs the above process according to one embodiment. The pseudocode traverses the call graph from nodes that have the least significant inclusive value until an accumulated exclusive value of eliminated nodes reaches a threshold given by the simplification factor. The pseudocode determines if a visited node should be eliminated if all callees for the visited node can be reachable from a root node without it.

In one embodiment, the pseudocode uses a variant of depth first traversal (DFT). The variant traverses a graph using DFT but assumes the direction of edges is reversed. That is, the edges instead of going from a node E to H, are assumed to go from H to E. Additionally, the variant has a prohibited edge list, which contains edges that must not be visited during the traversal. Thus, the prohibited edge list preserves certain nodes that should not be eliminated.

Linear Call Path Compression

Figure 6A:
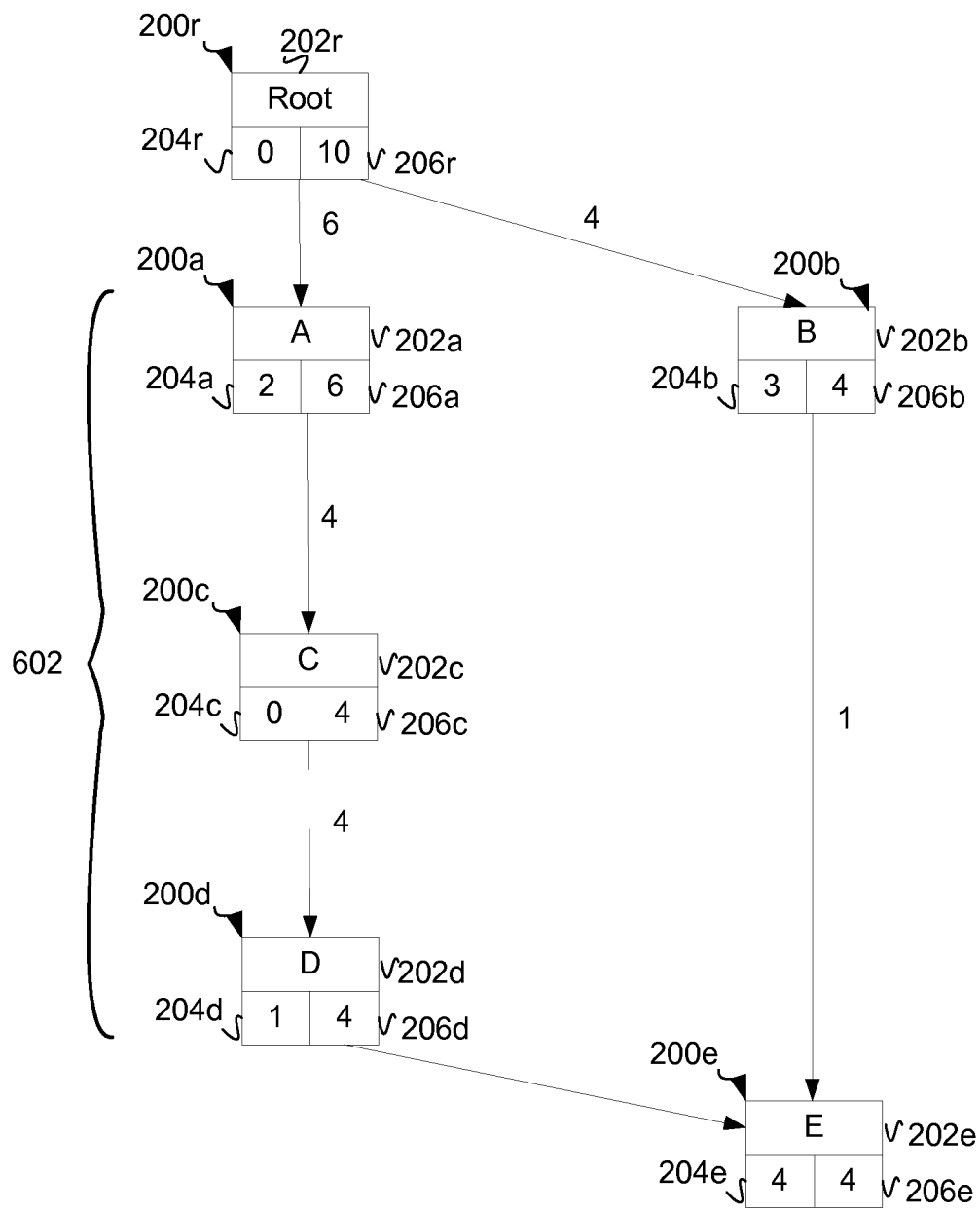
FIGS. 6A and 6B show an example of linear call path compression according to one embodiment.

Particular embodiments may also use linear call path compression to simplify a call graph. A linear call path is a sub-call graph whose nodes are connected with only one edge. FIG. 6A shows an example of a call graph 300 according to one embodiment. A linear call path 602 exists from node A to node D through a node C. The linear call path tends to deepen call graph 300 and can be replaced with a simpler representation.

Figure 6B:
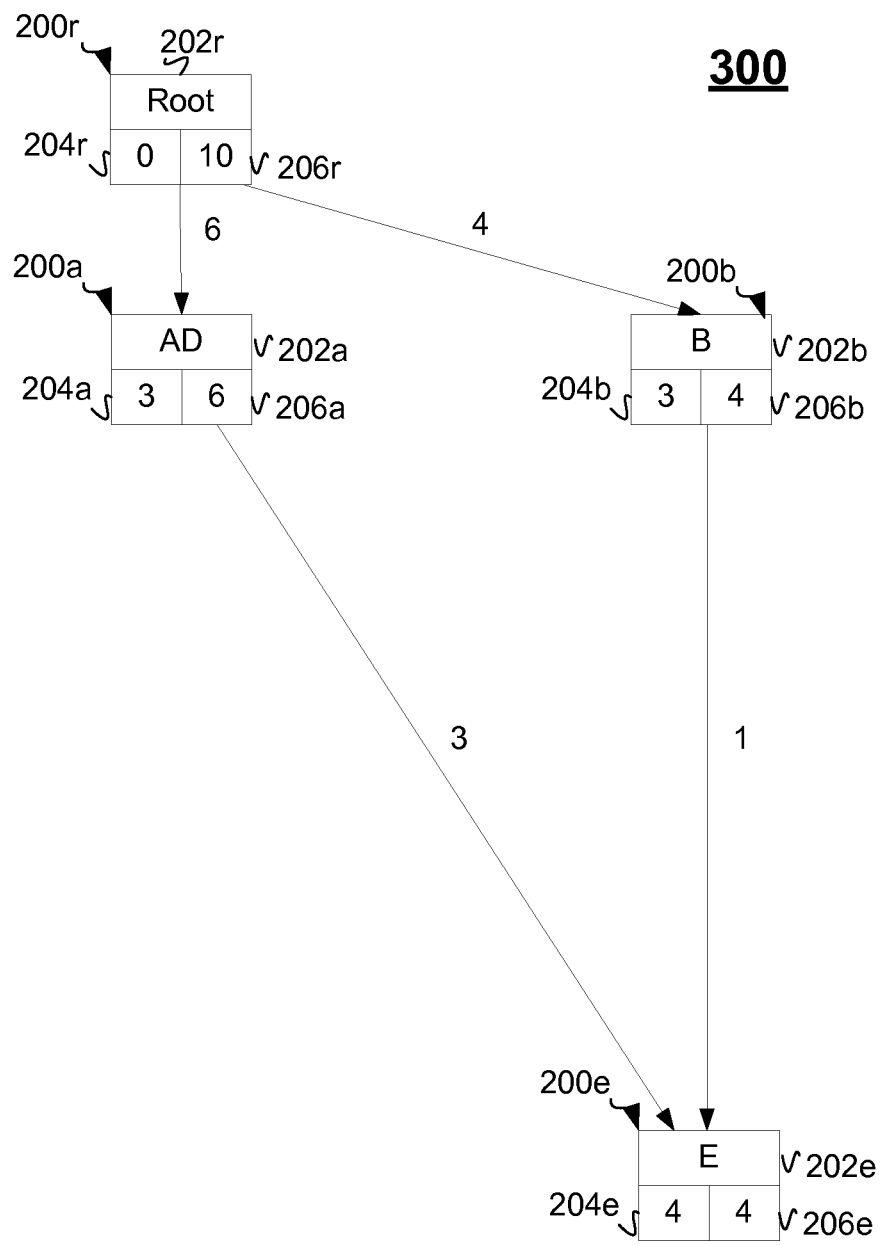

Nodes A, C, and D may be replaced with a special typed node that represents the linear call path. For example, FIG. 6B shows an example of call graph 300 with linear call graph compression performed according to one embodiment. A node AD is provided in place of nodes A, C, and D with an exclusive value of 3 and an inclusive value of 6. To form a special typed node, exclusive values are added up for the nodes in the linear call path. This results in an exclusive value of 3. The inclusive values are not added up. Rather, the inclusive value for the first node in the linear call path is used because the inclusive value includes the resources consumed by that node and its descendents. In this case, the inclusive value of 6 for node A is used for node AD.

The detection of linear call paths can be performed using the following pseudocode:

```
Simplify2(CallGraph G)
BEGIN
    Let L is a list of nodes which is the elements of a linear call path
    b = FALSE    // which represents whether the current visited node is
                 // in a linear call path or not
    FOR each node n FROM the root node by depth first traversal
    order DO
        IF b = FALSE and #OutEdges(N) = 1 THEN
            b = TRUE
            ADD n into L
        ELSE IF b = TRUE and #OutEdges(N) = 1 THEN
            ADD n into L
        ELSE IF b = TRUE THEN
            Replace the nodes in the list L
            with more simplified representation,
            e.g. special type node (we call it a linear call path node)
            b = FALSE
        ENDIF
    ENDFOR
END
```

Multiple Call Graph Comparisons

Particular embodiments may compare multiple call graphs and then simplify a resulting merged call graph. In one embodiment, multiple call graphs may be merged into a single merged call graph. The merged call graph may include nodes that have new exclusive values and inclusive values in addition to edges with new attributing values.

Figure 7:
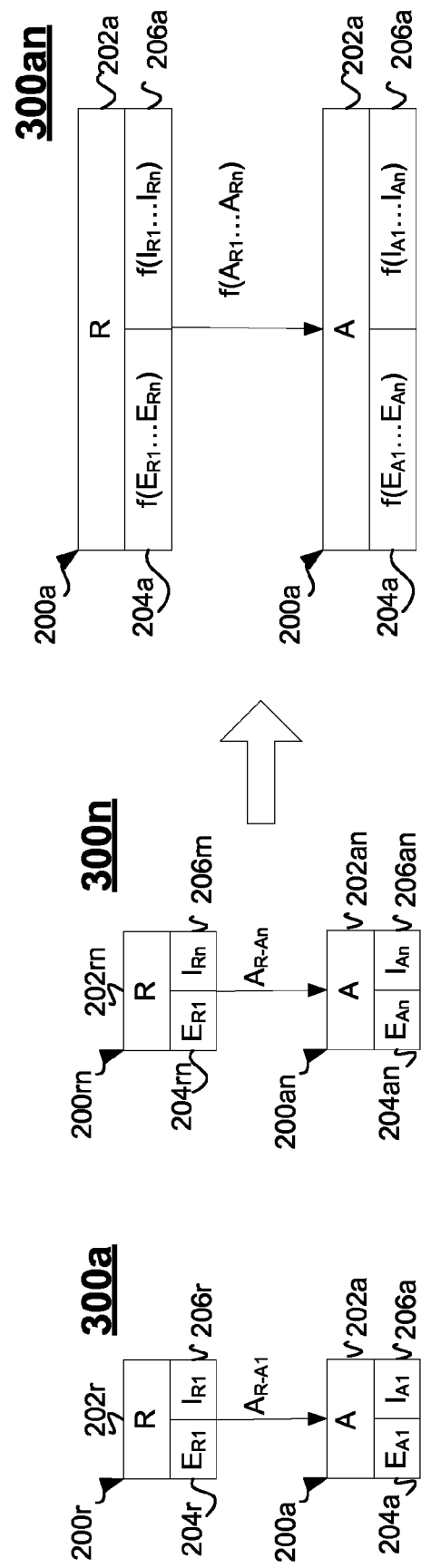
FIG. 7 shows an example of merging call graphs according to one embodiment.

FIG. 7 shows an example of merging call graphs according to one embodiment. A number of call graphs 300*a*-300*n* may be aggregated into a merged call graph 300*an*. The aggregation may be based on an aggregation function, such as standard deviation, variation, average, or other arithmetic/statistical functions.

Figure 8A:
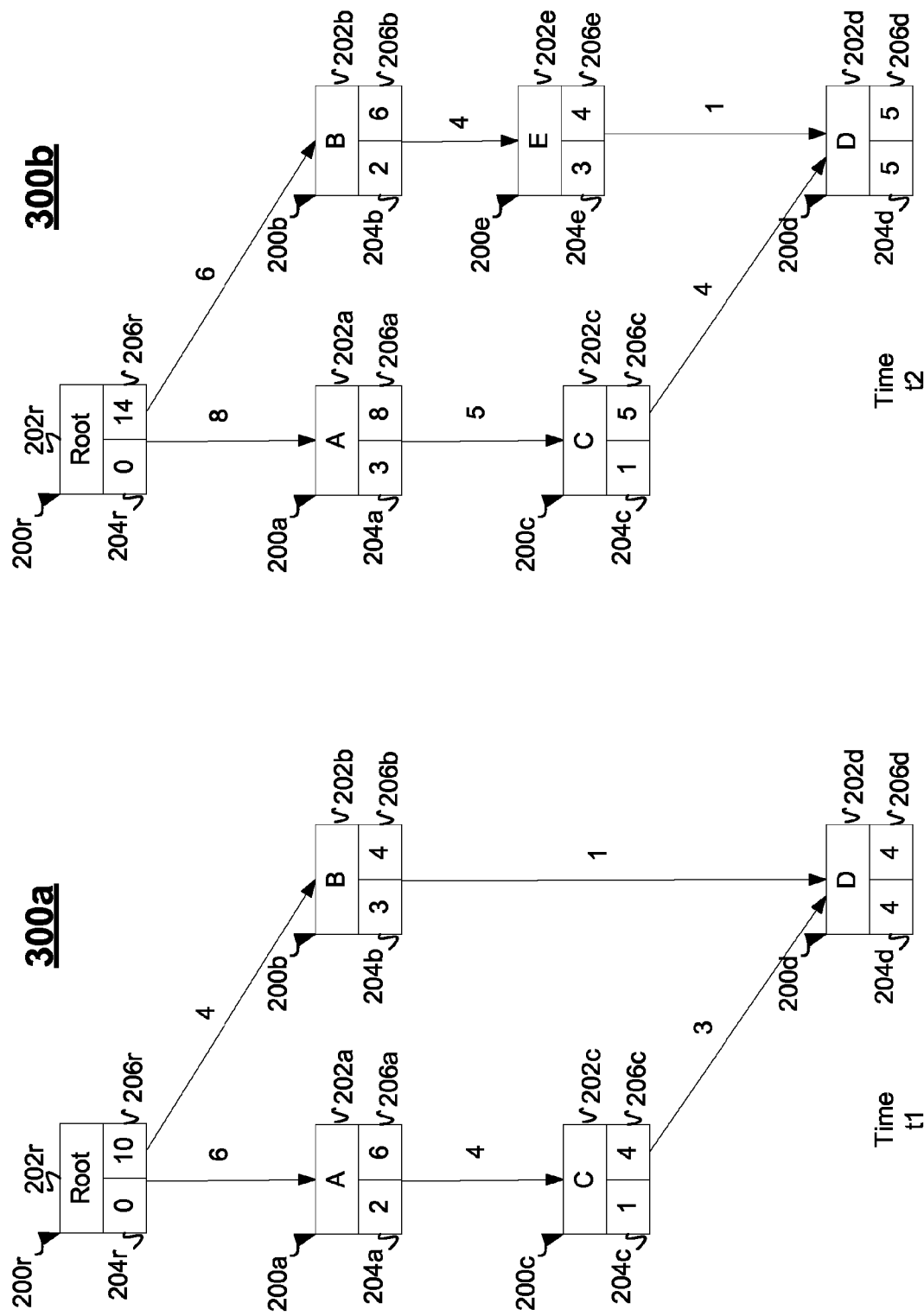
FIGS. 8A and 8B show a more detailed example of three call graphs that can be merged according to one embodiment.
Figure 8B:
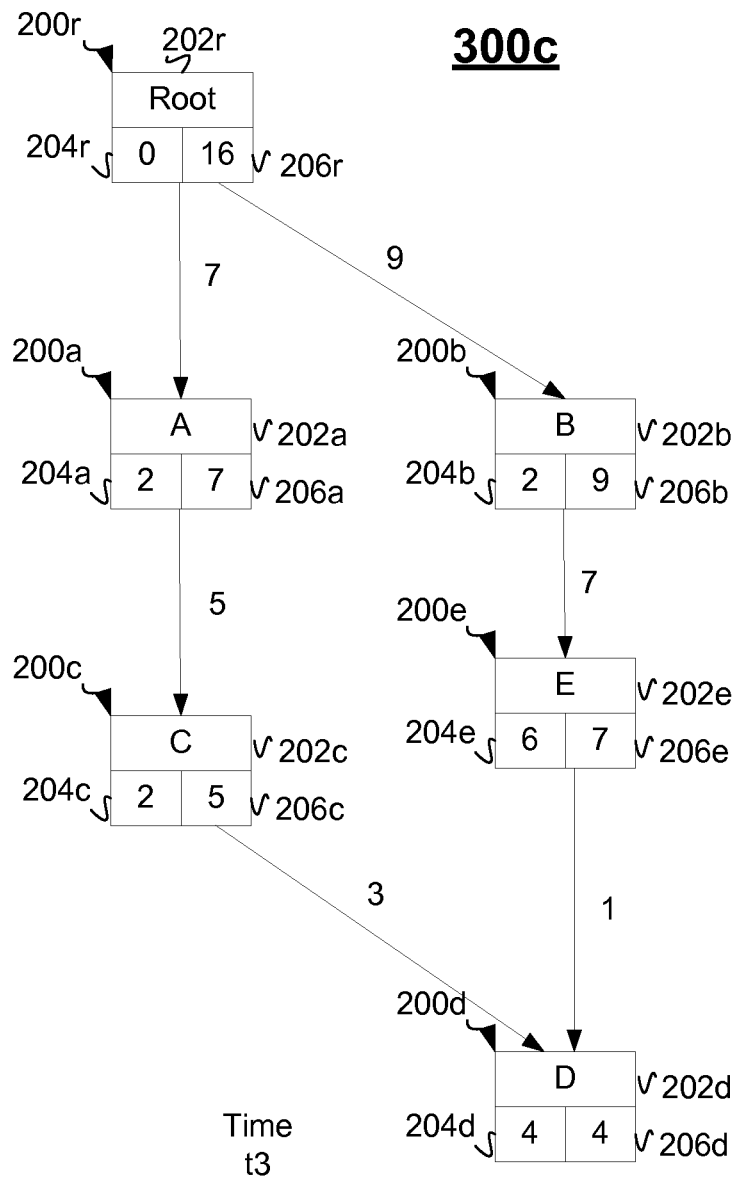

FIGS. 8A and 8B show a more detailed example of three call graphs that can be merged according to one embodiment. A first call graph 300*a* represents resource consumption at a time t1; a second call graph 300*b* represents resource consumption at a time t2; and a third call graph 300c represents resource consumption at a time t3. To aggregate call graphs 300a-300c, an aggregation function is used. In one example, an aggregation function is:

$$f(x_1, \ldots, x_n) = \Sigma_{i=2}^{n}(x_i - x_1).$$

Figure 9:
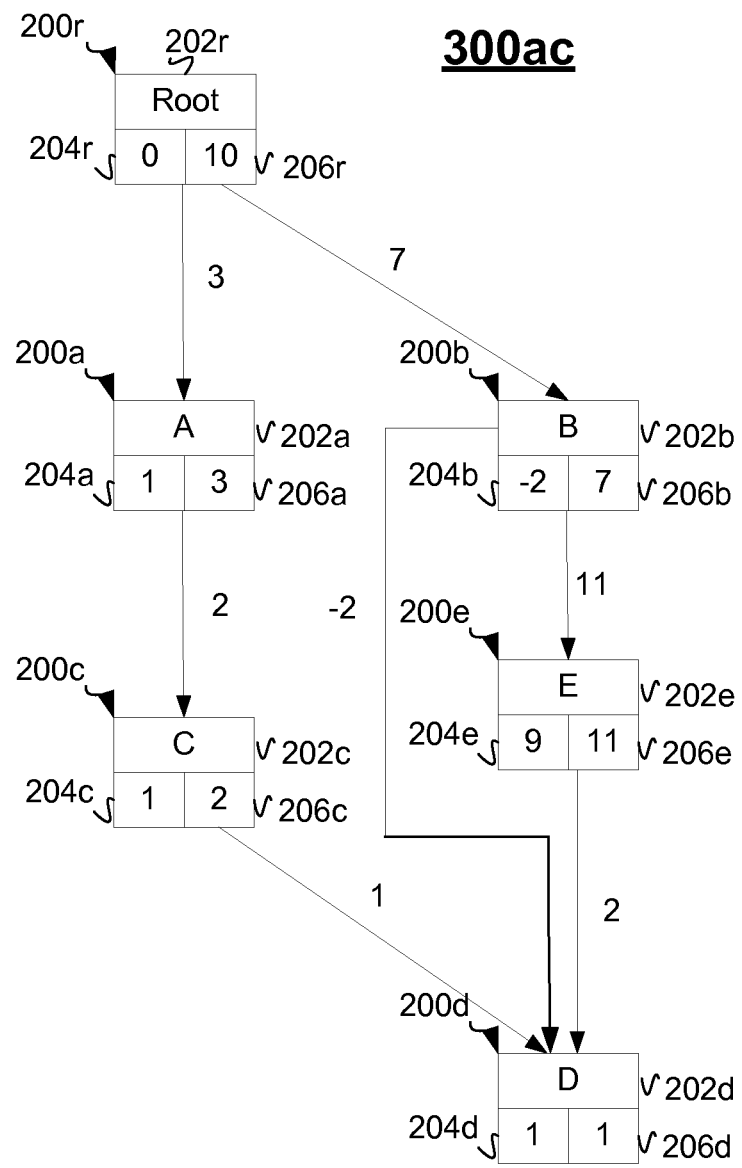
FIG. 9 shows a merged call graph that is determined from the three call graphs according to one embodiment.

FIG. 9 depicts a merged call graph 300ac that is determined from call graphs 300a-300a according to one embodiment. The values of call graph 300ac are determined by aggregating the difference between a node at the different times as compared to a baseline time at t1. For example, for node A, the merged exclusive value is 1. This is determined by taking the difference between the exclusive value of node A at time t2 from time t1: t2−t1=3−2=1. The difference between times t3 and t1 for node A is 2−2=0. The merged exclusive value is thus the total of the calculated differences: 1+0=1. For the merged inclusive value, the calculation is: t2−t1=8−6=2 and t3−t1=7−6=1. The merged inclusive value is: 2+1=3. For node B, the calculations for the inclusive value are: t2−t1=2−3 and t3−t1=2−3=−1. The total is: −1+−1=−2. For the exclusive value, the calculation are t2−t1=6−4=2 and t3−t1=9−4=5. The total is: 2+5=7. The other nodes' exclusive values and inclusive values may be determined in a similar manner.

Also, for the attributed values, the same methods may be used. From the root node to node A, the differences between t2 and t1 and t3 and t1 may be determined. In this case, the calculations are: t2−t1=8−6=2 and t3−t1=7−6=1. The total is: 2+1=3. The same calculations may be used to determine merged attributed values for other edges.

The following includes pseudocode that may perform the merge of multiple call graphs:

```
Merge(G₁, G₂, ..., Gₙ, f)
BEGIN
    Let G is a result call graph
    Let S is a set of symbols
    Extract all symbol names from call graph G₁, ..., Gₙ, and add them
into S
    FOR each symbol s in S DO
        Create new node N
        Symbol(N) = s
        Inclusive(N) = f(Inclusive(Node(G₁, s), ..., (Node(Gₙ, s)))
        Exclusive(N) = f(Exclusive(Node(G₁, s), ..., (Node(Gₙ, s)))
    ENDFOR
    FOR each pair of symbols (s₁, s₂) in S DO
        IF exists(Edge(Node(Gₓ, s₁), Node(Gₓ, s₂)) for some x in 1...n
THEN
            Create new edge E
            Caller(E) = Node(G, s₁)
            Callee(E) = Node(G, s₂))
            Attributed(E) = f(Attributed(Edge(Node(G₁, s₁), Node(G₂,
s₂)),
                    ..., Edge(Node(Gₙ, s₁), Node(Gₙ, s₂))
        ENDIF
    ENDFOR
END
```

Figure 10:
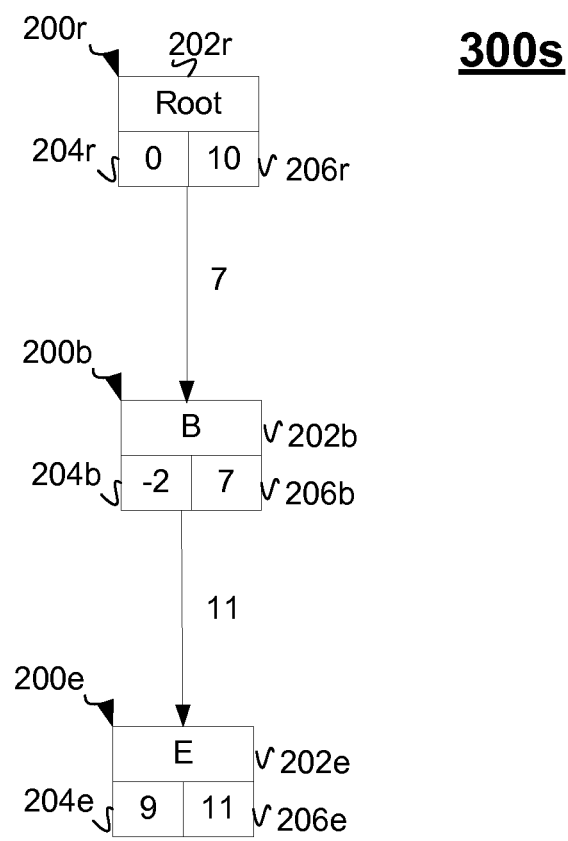
FIG. 10 shows an example of a simplified call graph for the merged call graph according to one embodiment.

Once merged call graph 300ac is determined, call graph 300ac may then be simplified using particular embodiments. FIG. 10 shows an example of a simplified call graph 300s according to one embodiment. As shown, call graph 300s includes the Root node, node B, and node E. Call graph 300s is determined using a simplification factor of 0.7. In this case, nodes D, C, and A are eliminated based on the call graph simplification.

Initial Suspects Finding

Particular embodiments may provide an initial suspects finding by extracting a critical call graph from a merged call graph. The call graph simplification may be used to determine the critical call graph. Then, nodes in the critical call graph that have been recently changed can be determined. For example, a version control system and source indexing tool may be used to determine which nodes have been recently changed. These nodes may then be analyzed to determine if they are contributing to an increase in resource consumption.

Using the example of the simplified call graph in FIG. 10, it can be determined that the call path from the root node to node B and then from node B to node E might be a source of monotonic increase in resource consumption between the time stamps t1 and t3. This may be determined because the call graph has been simplified to show these paths as being the most significant.

A source code indexing tool may determine the related source files for the root node, node B and node E. If, for example, a source file B.cpp has a function B, and a source file E.cpp has a function E, then the version control system may be queried about who has modified the files B.cpp and E.cpp between time stamps t1 and t3. These users may be determined as initial suspects as a cause of an increase in resource consumption.

In one example, the following pseudocode may be used to determine a list of initial suspects:

```
// G is a critical call graph generated by
//    call graph comparison and simplification
// t1, t2 is a timestamp, where the problem has been observed between
two FindInitialSuspects(G, t1, t2)
BEGIN
    FOR each node n in a call graph G DO
        List up all Modifer(DeclaredAt(Symbol(n)), t1, t2)
    ENDFOR
END
```

A code indexing tool may be used to determine a source file path where a symbol is implemented. A symbol may represent an object and may be part of a function associated with a node. For the psuedocode above, DeclaredAt(Symbol (S)) is the path of the source code where the symbol S is implemented. If there are two time stamps that have been defined in the version control system, a list of changes that have been applied to software system 106 between two time stamps may be determined. Also, users may be determined that have changed the source codes. If Modifier (P,t1,t2) is a user who modified source code P between time stamp t1 and t2, then the list of initial suspects of a given critical call path may be determined.

Figure 11:
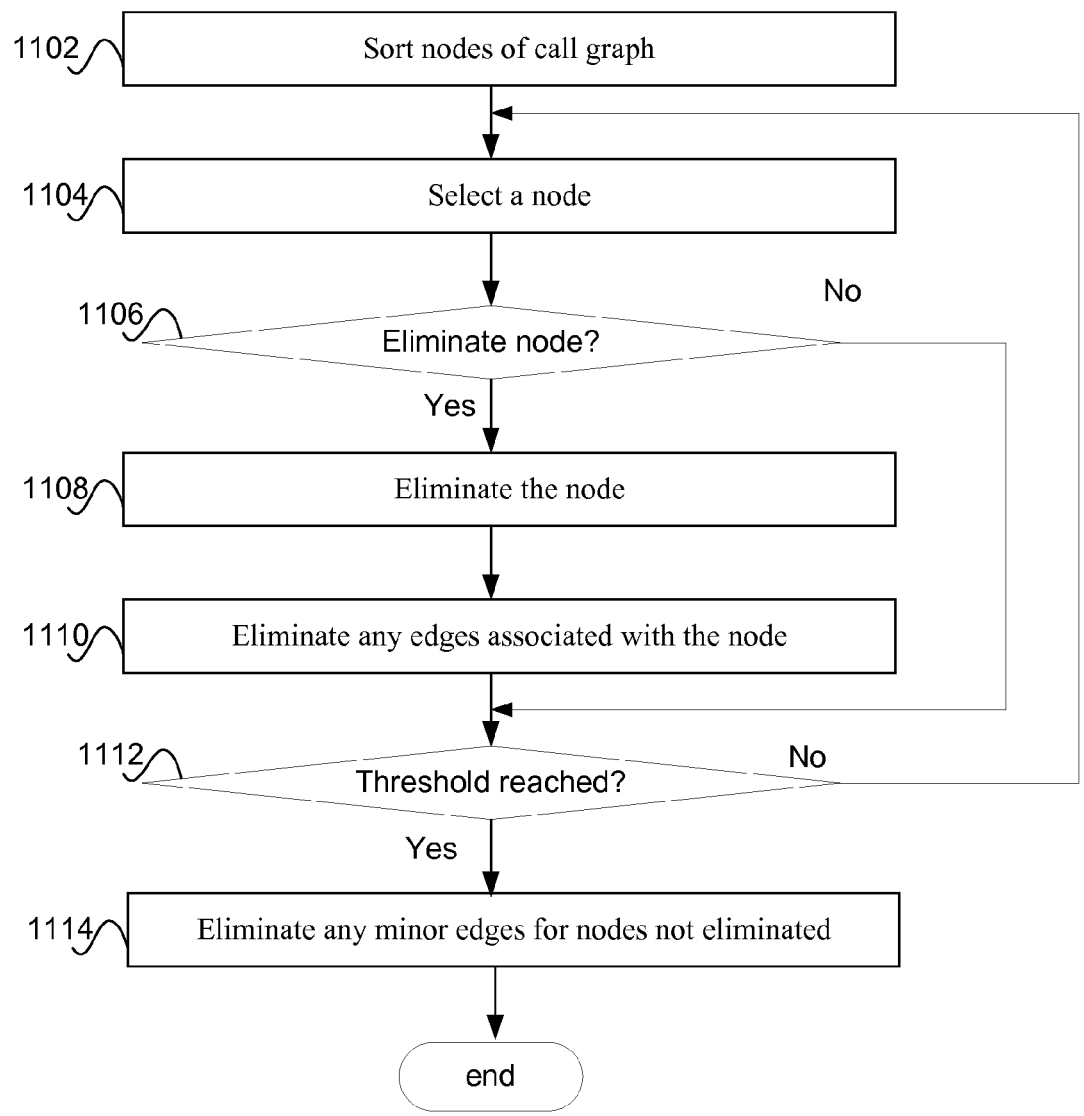
FIG. 11 depicts a method for call graph simplification according to one embodiment.

FIG. 11 depicts a simplified flowchart 1100 of a method for call graph simplification according to one embodiment. At 1102, call graph simplifier 104 sorts nodes of call graph 300. For example, nodes may be sorted based on their inclusive values.

At 1104, call graph simplifier 104 selects a node. For example, call graph simplifier 104 selects the node with the lowest inclusive value that has not been eliminated.

At 1106, call graph simplifier 104 determines if the node should be eliminated. A set of criteria may be used to determine if the node should be eliminated.

At 1108, if the node should be eliminated, call graph simplifier 104 eliminates the node. At 1110, call graph simplifier 104 also eliminates any edges associated with the node.

At 1112, if the node should not be eliminated or after the node is eliminated, call graph simplifier 104 determines if the threshold for the call simplification factor is met. For example, the amount of exclusive values eliminated is compared to the threshold. If the threshold is met, the process ends. At 1114, call graph simplifier 104 eliminates any minor edges for nodes not eliminated. For example, any edges that have attributed values less than a maximum attributed value for any eliminated nodes are eliminated. If the threshold is not met, call graph simplifier 104 determines another node to process at 1104.

Accordingly, particular embodiments provide a method for simplifying call graphs. The simplified call graph may improve call graph analysis and be used in regular quality assurance testing processes. By reducing the complexity of the call graph, users may concentrate on more critical parts of large call graphs and may be able to do call graph analysis more efficiently and more frequently. Further, critical call path identification by call path comparison and simplification allows for automatic initial suspects findings, which suggests users and functions that have been recently modified that affect critical call paths as an initial investigation prospect. This may reduce the initial investigation for performance regression for users because they can start with the initial suspects in their analysis.

Figure 12:
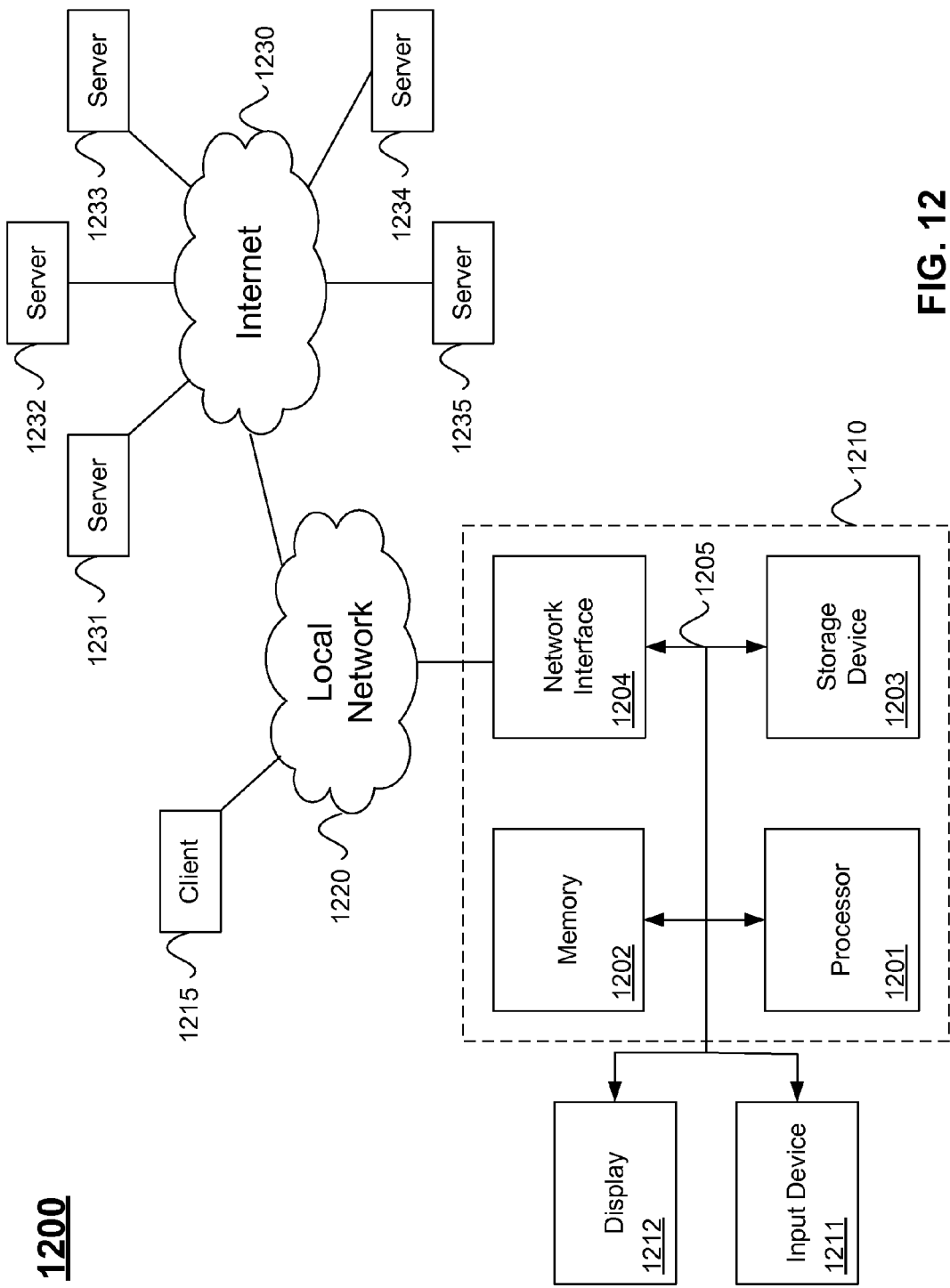
FIG. 12 is a block diagram of an example computer system and network for implementing particular embodiments.

FIG. 12 is a block diagram of an example computer system and network 1200 for implementing particular embodiments. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above. This memory may also be used for storing temporary variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques or embodying the constructs above, for example.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1204 sends and receives electrical, electromagnetic, or optical signals that carry digital data streams representing various types of information.

Computer system 1210 can send and receive information, including messages or other interface actions, through the network interface 1204 to an Intranet or the Internet 1230. In the Internet example, software components or services may reside on multiple different computer systems 1210 or servers 1231, 1232, 1233, 1234 and 1235 across the network. A server 1231 may transmit actions or messages from one component, through Internet 1230, local network 1220, and network interface 1204 to a component on computer system 1210.

The computer system and network 1200 may be configured in a client server manner. The client 1215 may include components similar to those of the computer system 1210.

Particular embodiments may be implemented in a computer-readable storage medium for use by or in connection with the instruction execution system, apparatus, system, or machine. Particular embodiments can be implemented in the form of control logic in software or hardware or a combination of both. The control logic, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
generating a call graph from an executable software system, the call graph comprising a plurality of nodes representing sub-routines, wherein each node is associated with an exclusive value and an inclusive value,
wherein the exclusive value of a particular node represents resources consumed by that particular node, and
wherein the inclusive value of the particular node represents resources consumed by the particular node and nodes that descend from the particular node;
successively eliminating, by a computing device, a first set of nodes in the plurality of nodes based on inclusive values for the plurality of nodes, wherein exclusive values of successively eliminated nodes are summed, and wherein said eliminating stops when the summed exclusive values is greater than or equal to a threshold; and
outputting a simplified call graph including a second set of nodes in the plurality of nodes, the second set of nodes not including the eliminated first set of nodes.

2. The method of claim 1, further comprising ranking the plurality of nodes based on inclusive values.

3. The method of claim 2, wherein successively eliminating the first set of nodes comprises evaluating nodes for elimination in order of said ranking, starting with a lowest ranking node having a lowest inclusive value.

4. The method of claim 3, wherein an evaluated node is not eliminated if the removal of the evaluated node would leave any descendant nodes without a path to a root node.

5. The method of claim 1, wherein the call graph further comprises a plurality of edges between the plurality of nodes, the method further comprising successively eliminating one or more edges, associated with eliminated nodes, that do not leave another node without a path to the root node.

6. The method of claim 5, wherein each edge has an associated attribute value representing how much of an inclusive value of a caller node resulted from a call to a callee node, the method further comprising successively storing a maximum value of eliminated edges.

7. The method of claim 6, further comprising, after said successively eliminating a first set of nodes, eliminating edges having an associated attribute value less than the maximum value of the eliminated edges.

8. The method of claim 1, further comprising eliminating a caller node of an eliminated node when (i) an inclusive value of the caller node is less than the inclusive value of the eliminated node and (ii) removal of the caller node would not leave any descendant nodes without a path to a root node.

9. The method of claim 1, wherein at least a portion of the call graph is a linear call path comprising a third set of nodes, wherein the third set of nodes are replaced with a single node having an exclusive value equal to the sum of exclusive values of the third set of nodes and an inclusive value equal to the inclusive value of a closest node to the root node in the third set of nodes.

10. A method comprising:
generating a plurality of call graphs from an executable software system, each call graph comprising a plurality of nodes, wherein multiple nodes in different call graphs correspond to the same sub-routines of the executable software system, wherein each node is associated with an exclusive value and an inclusive value, and wherein the plurality of call graphs represent resource consumption of the executable software system at different times,
wherein the exclusive value of a particular node represents resources consumed by that particular node, and
wherein the inclusive value of the particular node represents resources consumed by particular node and nodes that descend from particular node; and
generating a merged call graph from the plurality of call graphs using an aggregation function, wherein the aggregation function aggregates inclusive values for nodes in different call graphs corresponding to the same sub-routine, and wherein the aggregation function aggregates exclusive values for nodes in different call graphs corresponding to the same sub-routine.

11. The method of claim 10, wherein the plurality of call graphs have the same nodes, and wherein at least a portion of the nodes corresponding to the same sub-routine in different call graphs have different inclusive values and different exclusive values.

12. A method comprising:
generating a plurality of call graphs from an executable software system, each call graph comprising a plurality of nodes, wherein multiple nodes in different call graphs correspond to the same sub-routines of the executable software system, wherein each node is associated with one or more values indicating resource consumption, and wherein the plurality of call graphs represent resource consumption of the executable software system at different times;
generating a merged call graph from the plurality of call graphs, wherein said one or more values for nodes in different call graphs corresponding to the same sub-routine are combined according to a function, and wherein the combined values in the merged call graph represent resource consumption across said different times;
eliminating nodes from the merged call graph based on said combined values to generate a critical call graph indicating the nodes that consume the most significant amount of resources across said different times; and
determining source code files related to nodes in the critical call graph.

13. The method of claim 12, further comprising determining which related source code files have been modified across said different times.

14. The method of claim 12, further comprising determining a user who modified one or more modified source code files across said different times.

* * * * *